Nov. 11, 1958 C. G. TREADWELL 2,860,185

KEYED FREQUENCY MODULATION CARRIER WAVE SYSTEMS

Filed July 9, 1953 3 Sheets-Sheet 1

Inventor
C. G. TREADWELL
By R.P. Morris
Attorney

Nov. 11, 1958 C. G. TREADWELL 2,860,185

KEYED FREQUENCY MODULATION CARRIER WAVE SYSTEMS

Filed July 9, 1953 3 Sheets-Sheet 2

Inventor
C. G. TREADWELL
By [signature]
Attorney

KEYED FREQUENCY MODULATION CARRIER WAVE SYSTEMS

Filed July 9, 1953 3 Sheets-Sheet 3

Inventor
C. G. TREADWELL
By R. P. Morris
Attorney 2,860,185

KEYED FREQUENCY MODULATION CARRIER WAVE SYSTEMS

Cyril Gordon Treadwell, London, England, assignor to International Standard Electric Corporation, New York, N. Y., a corporation of Delaware Application July 9, 1953, Serial No. 367,049

Claims priority, application Great Britain July 18, 1952

4 Claims. (Cl. 179—15)

The present invention relates to electric pulse communication systems of the kind in which the pulses which are modulated by the signal wave are themselves transmitted over the communication medium by frequency modulation of a carrier wave.

The invention consists in an improvement or modification of the invention described and claimed in the specification of co-pending application of C. W. Earp, U. S. Serial No. 258,820, filed November 29, 1951, now Patent No. 2,784,255, which will be called the "parent specification" for convenience.

In a pulse position modulation system, the signal amplitudes are commonly represented by the time deviations of corresponding unidirectional pulses from a mean time position. The modulated pulses may be transmitted directly over a wide circuit, but it is more usual to transmit them by modulation of a carrier wave. When frequency modulation is employed, it is usual to provide an oscillator generating a continuous wave at some suitable frequency and to apply each pulse to modulate the frequency of the oscillator in accordance with the amplitude of the pulse. The pulses are all of the same amplitude and the frequency change persists only for the duration of the pulse. The advantage of this arrangement is that the bandwidth necessary to reproduce the pulses is much smaller than would be required if the pulses were transmitted by amplitude or phase modulation of the carrier wave.

The reason for this is that although the theoretical bandwidth necessary to transmit signals by frequency modulation is greater than that necessary for amplitude modulation, because the major part of the radiated energy resides in a wider band, the band-spread caused by the sharp transients associated with the leading and trailing edges of the pulses is much greater for amplitude modulation than for frequency modulation. In a similar way, the band-spread in the case of phase modulation is greater than in the case of frequency modulation. In the latter case, the amplitude of the carrier wave is constant, and the pulses only produce sharp changes of frequency of the wave, there being no sharp discontinuities in amplitude or phase.

In the case of pulse position modulation systems, the significant parameter is the time position of the pulse. In practice, the time position of only one edge of the pulse is employed at the receiver, and the other edge is therefore effectively wasted. Signalling time can therefore be saved if only one edge, preferably the leading edge, is transmitted. The trailing edge of a pulse usually takes more time to become established than the leading edge, and so if only the latter is transmitted more than half the time taken up in establishing a complete pulse is saved. A frequency modulation system has the useful property that both positive and negative changes can easily be transmitted, and advantage of this fact can be taken to save signalling time on the lines just indicated.

In telegraph systems, it has been common practice for years to transmit what are called "marking" and "spacing" signals. During marking intervals a current having a given value is transmitted to the line, while during spacing intervals a current having some other given value is transmitted. The signals which really convey the information are the changes in line current which occur between the marking and spacing intervals and these changes are alternately positive and negative. The wave which is transmitted to the line is thus a series of rectangular pulses (assuming no distortion), the leading and trailing edges of which constitute the real signals.

In the frequency-shift telegraph system, the above-mentioned rectangular pulses are applied to modulate the frequency of a carrier wave oscillator, so that waves of one frequency are continuously transmitted during marking periods and waves of another frequency are continuously transmitted during spacing periods. The principal object of the invention described in the parent specification is to adapt the telegraphic process which has just been explained to the transmission by frequency modulation of the pulses which are time position modulated by a complex signal wave, such as a speech wave. The advantage gained is that the signal representing each pulse is a frequency change in one direction only; and such a change can be established in rather less than than half the time necessary for transmitting the whole pulse by the more usual method, since in that case both the build-up and decay times must be included, and the latter is usually greater than the former.

Since therefore less time is taken up in establishing the signals in the system of the parent invention, it becomes possible to increase the number of channels which can be provided in a multiplex pulse system, for a given maximum time deviation, or alternatively for the same number of channels, to increase the maximum deviation, thereby improving the signal-to-noise ratio.

The object of the present invention is to improve the receiving arrangements of the system described in the parent specification.

This object is achieved according to the invention by providing a receiver for a multichannel electric pulse position modulation system of communication in which signals are conveyed by frequency modulating a carrier wave with a wave of rectangular pulses having a plurality of boundary edges, each boundary edge being time-position modulated in accordance with a corresponding complex signal wave, the said boundary edges corresponding alternately to odd- and even-numbered channels, comprising means for recovering the said wave of rectangular pulses from the frequency modulated carrier wave, means for applying the recovered wave of rectangular pulses to first and second channel dividers, the first channel divider including means for deriving from the recovered wave a plurality of interleaved trains of rectangular duration modulated pulses corresponding to odd-numbered channels, and the second channel divider including means for deriving from the recovered wave a plurality of interleaved rectangular duration modulated pulses corresponding to even-numbered channels, and means for separately recovering the corresponding complex signal wave from each individual train of rectangular duration modulated pulses.

The invention will be described with reference to the accompanying drawings in which.

In order to illustrate the invention, a 24-channel pulse position modulation system will be described. It will be assumed that channels 1 to 23 will be used to convey respective speech waves or other complex electrical waves, and that channel 24 will be used for conveying a synchronising signal to the receiver. The sampling frequency, that is, the mean repetition frequency of the pulses of any single channel pulse-train, will be taken as 10 kilocycles per second, so that the channel period, that is, the time period allotted to any single channel pulse is 4⅙ microseconds.

Figure 1:
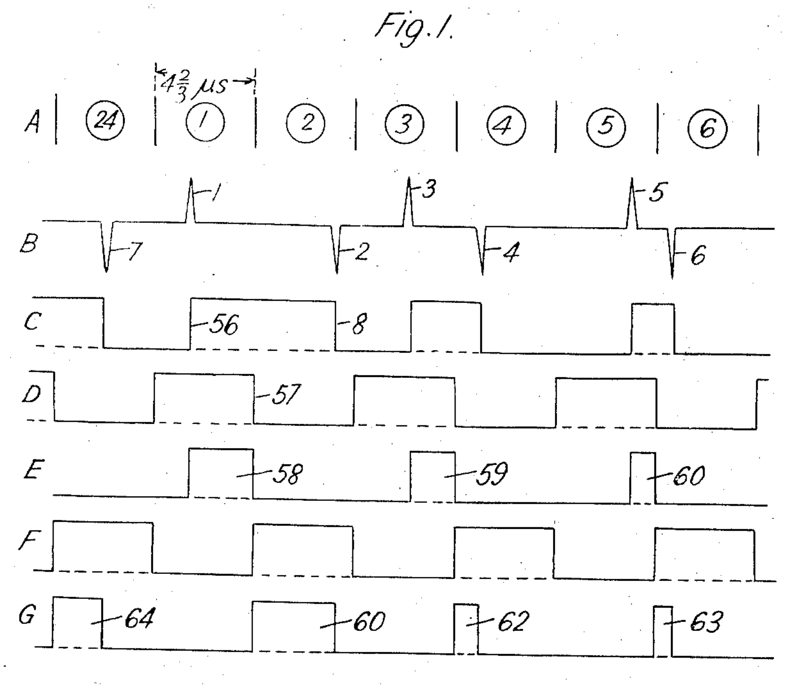
Fig. 1 shows graphical diagrams used to explain the operation of the system to which the present invention is applied.

As explained in the parent specification, position modulated channel pulses are generated at the transmitter and all the pulses corresponding to odd-numbered channels are of one sign and those corresponding to even-numbered channels are of the other sign. Referring to Fig. 1, Graph A shows the first six of the 4⅙ microsecond channel periods, and the preceding period of channel 24, and provides the time scale for all the other graphs of Fig. 1. These graphs indicate the relative timing of the pulses shown, but not their amplitudes.

Graph B shows the above-mentioned pulses which are generated at the transmitter (not illustrated).

Pulses 1, 3 and 5 are short positive channel pulses corresponding respectively to channels 1, 3 and 5, and are shown shifted by various amounts from the central positions in the channel periods to indicate that they are position modulated. Pulses 2, 4 and 6 are short negative position modulated channel pulses corresponding respectively to channels 2, 4 and 6. Pulse 7 is a short negative synchronising pulse occupying a fixed position in period 24. This pulse is distinguished from the channel pulses by having a larger amplitude not indicated in Graph B.

Graph C shows a wave of rectangular positive pulses derived at the transmitter from the pulses shown in Graph B, and is characterised by positive and negative-going edges which synchronise respectively with the positive and negative pulses of Graph B. The wave C is then applied to frequency-modulate a carrier wave which is radiated by a radio transmitter (not shown).

It will be observed that the time position of a vertical edge, such as 8, of the wave shown in Graph C with respect to its mean position indicates the amplitude of a sample of the speech wave or other complex wave of channel 2.

Figure 2:
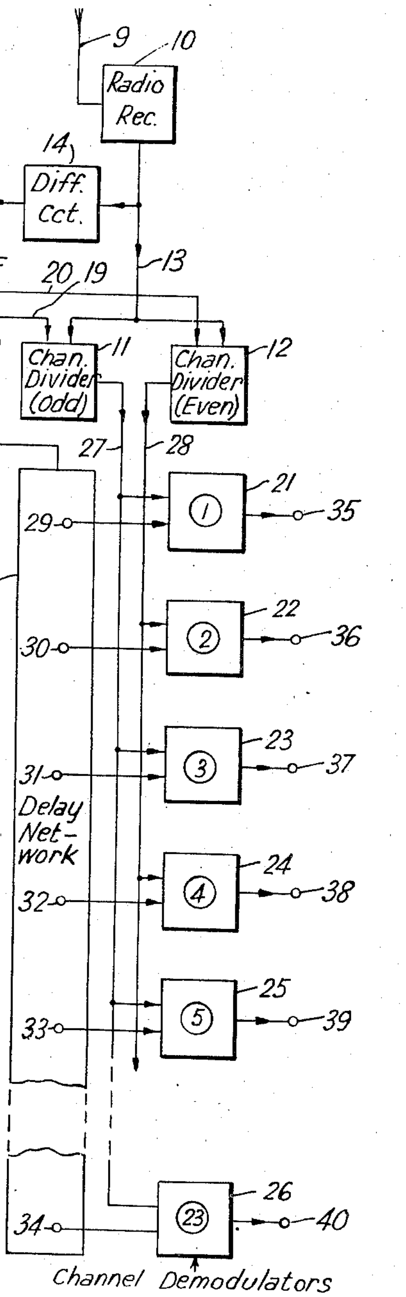
Fig. 2 shows a block schematic circuit diagram of the receiving arrangements in accordance with the invention, for the system.

Referring now to Fig. 2, which illustrates the receiving arrangements according to the present invention, the frequency-modulated carrier wave generated at the transmitter (not shown) is received on the antenna 9 and is demodulated in the radio receiver 10, which includes a frequency discriminator and other conventional arrangements for recovering the wave shown in Graph C, Fig. 1, from the modulated carrier wave. The wave C is applied to two similar channel dividers 11, 12, for odd and even channels respectively, over a conductor 13, and to a differentiating circuit 14, which substantially reproduces the pulses shown in Graph A. These pulses are applied to a conventional limiting amplifier 15 biased in such manner as to be responsive only to negative pulses whose amplitude exceeds that of the channel pulses 2, 4, 6. This amplifier thus selects all the synchronising pulses (which are of larger amplitude than the channel pulses) and applies them to a pulse shaper 16, which produces a response to each synchronising pulse a positive rectangular gating pulse of duration 4⅙ microseconds. These gating pulses are in turn applied to a delay network distributor 17 for gating the channel demodulators according to known practice.

The pulses selected by the limiting amplifier 15 are also applied to a frequency multiplier 18 which multiplies by 12 and includes pulse shaping and phasing means for generating two trains of positive rectangular timing pulses of duration 4⅙ microseconds, the pulses of one train occuring in the intervals between the pulses of the other train. These two trains of timing pulses are shown respectively in Graphs D and F of Fig. 1 and will be called timing trains D and F.

Train D is phased so that the pulses thereof synchronise with the odd-numbered channel periods, as shown, and train F so that the pulses synchronise with the even-numbered channel periods. Trains D and F are supplied respectively over conductors 19 and 20 (Fig. 2) to the odd and even channel dividers 11 and 12. Connected to the channel dividers are 23 similar channel demodulators of which only the first five and the last are shown in Fig. 2. They are designated 21 to 26 respectively. The output of the channel divider 11 is connected over conductor 27 to all the demodulators corresponding to odd-numbered channels, and the output of the channel divider 12 is connected over conductor 28 to all the demodulators corresponding to even-numbered channels. As will be explained later, the channel dividers produce rectangular pulses the duration of each of which is determined by a corresponding one of the pulses shown in Graph B, Fig. 1. In order that these pulses may be distributed to the proper channel demodulators, the latter are all normally blocked, and are unblocked in turn by the gating pulses from tapping points 29 to 34 on the delay network 17, these tapping points being spaced apart by amounts corresponding to a delay 4⅙ microseconds. This is a conventional arrangement.

The respective speech waves are obtained from terminals 35 to 40 connected to the outputs of the demodulators 21 to 26.

Figure 3:
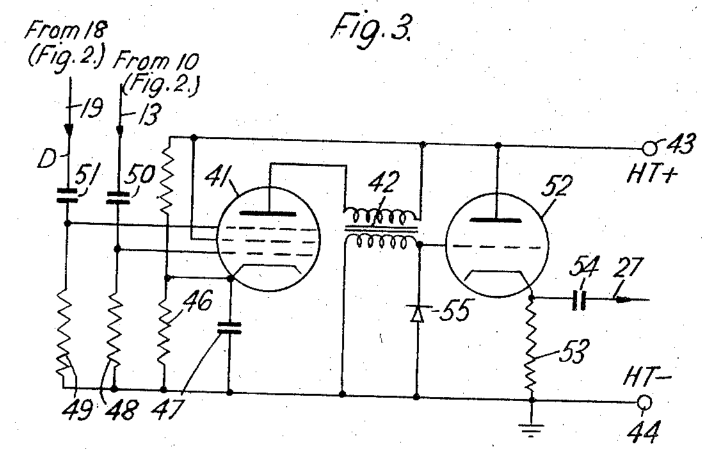
Fig. 3 shows a detailed circuit diagram of the channel dividers used in Fig. 2.

Fig. 3 shows details of the channel divider 11 for odd-numbered channels. It comprises a pentode valve 41 which is biased so that it is normally cut off by both the control grid and the suppressor grid. The anode is connected through the primary winding of a transformer 42 to the positive terminal 43 for the high tension source (not shown) the corresponding negative terminal 44 being connected to ground. Two resistors 45, 46 are connected in series between terminals 43 and 44, and the cathode of the valve 41 is connected to the junction point of these resistors to provide the cut-off bias. The resistor 46 is shunted by a by-pass capacitor 47.

The control grid and suppressor grid are connected to ground through respective leak resistors 48 and 49, and conductor 13 from the radio receiver 10 (Fig. 2) is connected through a blocking capacitor 50 to the control grid. Conductor 19 from the frequency multiplier 18 (Fig. 2) (which conveys the D timing pulses) is connected to the suppressor grid through a blocking capacitor 51.

The secondary winding of the transformer 42 has one terminal connected to ground and the other to the control grid of a cathode follower amplifying valve 52, the anode of which is connected directly to terminal 43 and the cathode of which is connected to ground through a load resistor 53. The output conductor 27 connected to the demodulators of the odd numbered channels (Fig. 2) is connected to the cathode through a blocking capacitor 54.

The valve 41 will generate a negative pulse at the anode each time it is unblocked, and the transformer 42 is poled to reverse these pulses, so that a positive pulse is delivered to the control grid of the valve 52 in response to each negative pulse generated by the valve 41. A rectifier 55 connects the control grid of the valve 52 to ground and is poled so that it will be blocked by the positive pulses applied to the control grid of the valve 52. This is for the purpose of preventing the transformer 42 from "ringing" as a result of shock-excitation by the pulses.

The operation of the circuit of Fig. 3 will be explained with reference to Fig. 1, Graphs C, D and E. The positive pulses of Graphs C and D are applied respectively to the control grid and suppressor grid of the valve 41. Thus for any period during which part of one of the pulses C coincides in time with part of one of the pulses D the valve 41 will be unblocked, and a corresponding positive pulse will be delivered to the control grid of the valve 52. It will be found that such coincidence can only occur during odd-numbered channel periods. Thus during channel period 1, the necessary coincidence occurs between the time of occurrence of the leading edge 56, Graph C, and the time of occurrence of trailing edge 57, Graph D. The corresponding positive pulse applied to the valve 52 is shown at 58, Graph E. It will be seen that the leading edge of the pulse 58 follows the movements of the channel pulse 1, Graph B, while the trailing edge is fixed. The pulses 58 repeated in successive channel 1 periods are thus duration modulated, and the speech wave can be recovered by passing them through a low-pass filter in the usual way.

In Graph E, pulses 59 and 60 represent the pulses supplied to the valve 52 (Fig. 3) in channel periods 3 and 5.

The pulses shown in Graph E, after amplification by the cathode follower valve 52 (Fig. 3) are delivered to conductor 27 from the cathode to the valve and thence to the odd-numbered channel demodulators (Fig. 2).

The channel divider 12 (Fig. 2) is also as shown in Fig. 3, the only difference being that conductor 20 (Fig. 2) carrying the F pulses is connected to capacitor 51 instead of conductor 19, and the output capacitor 54 is connected to conductor 28 instead of 27 (Fig. 2). The operation will be understood from Graphs C, F and G (Fig. 1) and the only difference is that the pulses applied to the valve 52 (Fig. 3) have movable trailing edges and fixed leading edges, and these pulses occur only in the even-numbered channel periods. Thus the leading edge of the channel 2 pulse 60, Graph G, coincides with the fixed leading edge 61 of the timing pulse (Graph F) and the trailing edge of pulse 60 coincides with the trailing edge 8 of Graph C. Pulses 62 and 63 of Graph G are the corresponding output pulses for channels 4 and 6.

It will be noted that a pulse 64 corresponding to the synchronising pulse 7 (Graph B) occurs during the synchronising period corresponding to channel 24, but since no channel demodulator corresponding to this period is provided, the pulse 64 has no effect.

It is necessary to choose the first tapping point 29 on the delay network 17 (Fig. 2) so that the gating pulse derived from the pulse shaper 16 is applied to the demodulator 21 so that it unblocks this demodulator during the period corresponding to channel 1 at the receiver.

Figure 4:
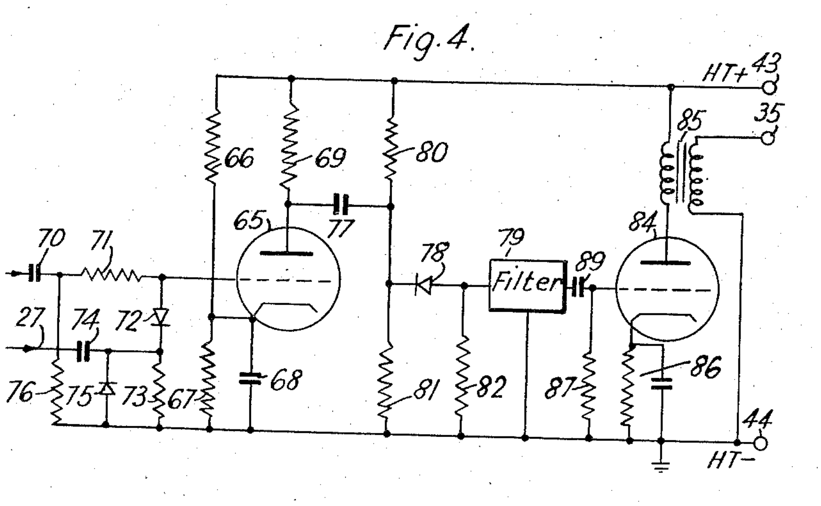
Fig. 4 shows a detailed circuit diagram of the channel demodulators used in Fig. 2.

Details of the demodulator 21 are shown in Fig. 4. All the other demodulators are similar. The pulses shown in Graph E (Fig. 1) are applied to a gating valve 65 which is normally blocked by the application to the cathode of a bias potential derived from two resistors 66, 67 connected in series between the high tension terminals 43 and 44. The cathode is connected to the junction point of these resistors, and to ground through a by-pass capacitor 68. The anode is connected through a load resistor 69 to terminal 43.

The gating pulses from tap 29 of the delay network 17 (Fig. 2) are supplied through a blocking capacitor 70 and a resistor 71 to the control grid of the valve 65, this grid being connected to ground through a rectifier 72 and a resistor 73. The pulses from the odd channel divider 11 (Figs. 2 and 3) are supplied over conductor 27 to the junction point of elements 72 and 73 through a blocking capacitor 74, and a rectifier 75 shunts the resistor 73. A leak resistor 76 for the control grid of the valve 68 connects the junction point of elements 70 and 71 to ground.

The rectifier 72 is poled so that it will conduct if the control grid should acquire a positive potential, and the rectifier 75 is oppositely poled.

The valve 65 operates in the following manner. When a positive gating pulse is applied over capacitor 70, it is unable to unblock the valve, because it is by-passed by the rectifier 72 through the resistor 73, and cannot raise the control grid to a sufficiently high potential to unblock the valve. However, as soon as the leading edge of the positive pulse 58 (Graph E, Fig. 1) arrives over conductor 27, it blocks the rectifier 72, and enables the gating pulse to unblock the valve. On the arrival of the trailing edge of the pulse 58, the valve blocks again. Thus the valve 65 generates at its anode a negative pulse having exactly the same duration as the pulse 58. In the absence of any gating pulse, a pulse such as 59 belonging to a different channel cannot by itself unblock the valve 65 because then the rectifier 72 is blocked and prevents the pulse from raising the control grid to a sufficiently high potential. It should be noted that the time during which the wave 65 is unblocked is determined precisely by the pulse 58, so that the gating pulse need not have sharp leading and trailing edges, and may have a duration somewhat longer than the duration of a channel period (4⅔ microseconds).

The rectifier 75 is provided to prevent the capacitor 74 from acquiring a negative charge.

The negative pulses generated at the anode of the valve 56 are applied through a blocking capacitor 77 and a rectifier 78 to the input terminal of a low pass filter 79 designed to cut off at a frequency just above the upper frequency of the band occupied by the speech wave. Two resistors 80 and 81 are connected in series between terminals 43 and 44 and elements 77 and 78 are connected to the junction point of these resistors. The junction point of elements 78 and 79 is connected to ground through a high resistor 82.

The resistors 80 and 81 are provided to supply a small positive bias potential for blocking the rectifier 78. This rectifier is provided as a precaution to block any small unwanted pulses which might be produced by the valve 65 during the other odd-numbered channel periods as a result of crosstalk or interference. The rectifier will be unblocked by the wanted pulse of channel 1 which will be of larger amplitude than the bias potential.

According to conventional practice, the filter 79 is provided to recover the channel 1 speech wave from the train of pulses similar to 58 which occur in successive channel 1 periods, and which are duration modulated in accordance with the original speech wave. The output of the filter is connected through a blocking capacitor 83 to the control grid of a low frequency amplifying valve 84, the anode of which is connected to terminal 43 through the primary winding of an output transformer 85. One end of the secondary winding of this transformer is connected to ground, and the other end of the output terminal 35, shown also in Fig. 2. The valve 84 is provided with the usual bias network 86 connecting the cathode to ground, and a leak resistor 87 is provided for the control grid.

All the channel demodulators in Fig. 2 are the same, but the demodulators corresponding to even-numbered channels have the capacitor 74 (Fig. 4) connected to the even channel divider 12 (Fig. 2) over conductor 28.

No details are given of elements 10, 14, 15, 16, 17 and 18 of Fig. 2, since all of them are conventional devices well known to those skilled in the art.

In the parent specification, the edges such as 8 and 56 of the wave shown in Graph C, Fig. 1, are called "boundary edges," and it was pointed out that there must be an even number of such edges. Since in the system described to illustrate the present invention there are an odd number of communication channels, only one synchronising pulse is provided in channel period 24. If, as in the system described in the parent specification, there had been an even number of channels, it would have been necessary to provide a group of two or some other even number of synchronising pulses in the synchronising period. It should be mentioned that in the present case a group of any odd number of synchronising pulses could have been provided during period 24, and they could have been selected by a coincidence method, such as that described in the parent specification, instead of by the use of an amplitude limiter.

While the principles of the invention have been described above in connection with specific embodiments, and particular modifications thereof, it is to be clearly understood that this description is made only by way of example and not as a limitation on the scope of the invention.

What I claim is:

1. A receiver for a multichannel electric pulse position modulation system of communication in which signals are conveyed by frequency modulating a carrier wave with a wave of rectangular pulses having a plurality of boundary edges, each boundary edge being time-position modulated in accordance with a corresponding complex signal wave, the said boundary edges corresponding alternately to odd- and even-numbered channels, comprising means for recovering the said wave of rectangular pulses from the frequency modulated carrier wave, means for applying the recovered wave of rectangular pulses to first and second channel dividers, the first channel divider including an electron device having parallel inputs for simultaneously applying thereto two trains of rectangular pulses derived from the recovered wave and for deriving from the recovered wave a plurality of interleaved trains of rectangular duration modulated pulses corresponding to odd-numbered channels, and the second channel divider including means for deriving from the recovered wave a plurality of interleaved rectangular duration modulated pulses corresponding to even-numbered channels, and means for separately recovering the corresponding complex signal wave from each individual train of rectangular duration modulated pulses.

2. A receiver according to claim 1 in which the wave of rectangular pulses includes boundary edges defining a periodic synchronising signal, comprising means for recovering the synchronising signal from the wave of rectangular pulses, means for deriving first and second trains of rectangular timing pulses from the synchronising signal, the said timing pulses having duration equal to the period allotted to one channel, and the timing pulses of the first train synchronising with the odd-numbered channel periods, and those of the second train synchronising with the even-numbered channel periods, and means for applying the first train to the first channel divider and the second train to the second channel divider.

3. A receiver according to claim 2 in which said timing pulses are positive and one channel divider includes a normally blocked valve to which the corresponding train of timing pulses and the recovered wave of rectangular pulses are simultaneously applied, the arrangement being such that the valve is unblocked for those periods during which part of a positive timing pulse synchronises with part of a positive pulse of the said wave of rectangular pulses, and means for deriving the rectangular duration modulated pulses from the said valve.

4. A receiver according to claim 2 in which each channel divider includes a coincidence device adapted to produce an output during those periods in which part of a timing pulse coincides with part of a pulse of the said wave of rectangular pulses, and means for deriving the rectangular duration modulated pulses from said device.

References Cited in the file of this patent

UNITED STATES PATENTS

| | | |
|---|---|---|
| 2,429,631 | Labin | Oct. 28, 1947 |
| 2,468,059 | Greig | Apr. 26, 1949 |
| 2,498,678 | Greig | Feb. 28, 1950 |